US011954669B1

(12) United States Patent
Osterkamp et al.

(10) Patent No.: US 11,954,669 B1
(45) Date of Patent: Apr. 9, 2024

(54) RFID-ENABLED PAYMENT AUTHENTICATION

(71) Applicant: United Services Automobile Association (USAA), San Antonio, TX (US)

(72) Inventors: Bryan J. Osterkamp, New Braunfels, TX (US); Kelly Q. Baker, San Antonio, TX (US); David M. Jones, Jr., San Antonio, TX (US); Ryan Thomas Russell, San Antonio, TX (US); Robert Andrew Massie, San Antonio, TX (US); Jon D. McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/879,548

(22) Filed: Aug. 2, 2022

Related U.S. Application Data (62) Division of application No. 17/005,018, filed on Aug. 27, 2020, now Pat. No. 11,416,844.

(Continued)

(51) Int. Cl.
*G06Q 20/32* (2012.01)
*G01S 19/51* (2010.01)
(Continued)

(52) U.S. Cl.
CPC .......... *G06Q 20/3278* (2013.01); *G01S 19/51* (2013.01); *G06K 7/10366* (2013.01);
(Continued)

(58) Field of Classification Search
CPC .. G06Q 20/3278; G06Q 20/02; G06Q 20/204; G06Q 20/3224; G06Q 20/326;
(Continued)

(56) References Cited

U.S. PATENT DOCUMENTS 9,477,938 B1 * 10/2016 Russell ................ G06Q 10/087
9,842,330 B1 * 12/2017 Van Os ................ G06Q 20/342
(Continued)

FOREIGN PATENT DOCUMENTS

WO 2017033118 A1 3/2017

*Primary Examiner* — Michael Jared Walker
(74) *Attorney, Agent, or Firm* — Fletcher Yoder, P.C.

(57) ABSTRACT

Authentication method and systems using RFID-enabled payment cards are disclosed herein where a server receives a request corresponding to authorization of a payment associated with a payment card from an electronic terminal. The server identifies an electronic device of a user associated with the payment card. The server then transmits an instruction to the electronic device to cause an RFID reader of the electronic device to determine whether an RFID tag corresponding to the payment card is located within a predetermined proximity to the electronic device. When the payment card is located within the predetermined proximity, the server executes a first authentication protocol. Moreover, when the payment card is not located within the predetermined proximity, the server executes a second authentication protocol, wherein the second authentication protocol is more restrictive than the first authentication protocol.

13 Claims, 8 Drawing Sheets

Related U.S. Application Data (60) Provisional application No. 62/893,018, filed on Aug. 28, 2019.

(51) Int. Cl.
*G06K 7/10* (2006.01)
*G06Q 20/02* (2012.01)
*G06Q 20/20* (2012.01)
*G06Q 20/34* (2012.01)
*G06Q 20/40* (2012.01)
*G06Q 20/42* (2012.01)

(52) U.S. Cl.
CPC .......... *G06Q 20/02* (2013.01); *G06Q 20/204* (2013.01); *G06Q 20/3224* (2013.01); *G06Q 20/326* (2020.05); *G06Q 20/352* (2013.01); *G06Q 20/4015* (2020.05); *G06Q 20/42* (2013.01); *G06Q 20/321* (2020.05)

(58) Field of Classification Search
CPC .. G06Q 20/352; G06Q 20/4015; G06Q 20/42; G06Q 20/321; G01S 19/51; G06K 7/10366
See application file for complete search history.

(56) References Cited

U.S. PATENT DOCUMENTS

| | | | | |
|---|---|---|---|---|
| 10,223,521 B1* | 3/2019 | Goodrich | | G06Q 20/3278 |
| 10,255,595 B2* | 4/2019 | Van Os | | G06Q 20/3276 |
| 10,366,378 B1* | 7/2019 | Han | | G06Q 20/204 |
| 10,474,941 B2* | 11/2019 | Wurmfeld | | G06K 19/07722 |
| 10,726,219 B1* | 7/2020 | Yaqub | | G07F 7/0893 |
| 11,182,771 B2* | 11/2021 | Rule | | G06Q 20/3278 |
| 2007/0084913 A1* | 4/2007 | Weston | | G06Q 20/3224 235/383 |
| 2008/0035725 A1* | 2/2008 | Jambunathan | | G06Q 20/325 235/380 |
| 2012/0253974 A1* | 10/2012 | Haikonen | | G06Q 20/3278 705/42 |
| 2012/0286936 A1* | 11/2012 | Mullen | | G06Q 40/00 340/10.2 |
| 2013/0103519 A1* | 4/2013 | Kountotsis | | G06Q 20/28 705/23 |
| 2014/0330727 A1* | 11/2014 | McNeight | | G06Q 20/3821 705/67 |
| 2015/0227923 A1* | 8/2015 | Kutsch | | G06Q 20/3224 705/67 |
| 2015/0379791 A1* | 12/2015 | Russell | | G06K 19/07762 340/5.61 |
| 2016/0253651 A1* | 9/2016 | Park | | G06Q 20/34 705/39 |
| 2016/0253670 A1* | 9/2016 | Kim | | G06Q 20/386 705/72 |
| 2017/0068953 A1* | 3/2017 | Kim | | G06Q 20/3278 |
| 2017/0109620 A1* | 4/2017 | Wurmfeld | | G06K 19/07722 |
| 2017/0148018 A1* | 5/2017 | Levin | | G06Q 20/202 |
| 2017/0201524 A1* | 7/2017 | Dureau | | H04N 21/25841 |
| 2018/0012222 A1* | 1/2018 | Berger | | G06Q 20/3223 |
| 2018/0018665 A1* | 1/2018 | Chene | | H04L 9/3247 |
| 2018/0181959 A1* | 6/2018 | Tranganidas | | G06Q 20/405 |
| 2019/0019192 A1* | 1/2019 | Kumawat | | G06Q 20/4014 |
| 2019/0034911 A1* | 1/2019 | Wilson | | G06Q 20/40145 |
| 2019/0205119 A1* | 7/2019 | Naibero | | H04L 67/55 |
| 2019/0392427 A1* | 12/2019 | Wilson | | G06Q 20/3563 |
| 2020/0210991 A1* | 7/2020 | Bernholc | | G06Q 20/208 |
| 2021/0350287 A1* | 11/2021 | Mullen | | G06Q 20/3278 |

\* cited by examiner

RFID-ENABLED PAYMENT AUTHENTICATION

CROSS-REFERENCE TO RELATED APPLICATIONS

This application is a Divisional of U.S. patent application Ser. No. 17/005,018, entitled "RFID-ENABLED PAYMENT AUTHENTICATION," filed Aug. 27, 2020, which claims priority to U.S. Provisional Application Ser. No. 62/893,018, entitled RFID-ENABLED PAYMENT AUTHENTICATION, and filed on Aug. 28, 2019, the disclosures of which are hereby incorporated by reference in their entirety for all purposes.

TECHNICAL FIELD

The present disclosure relates generally to authentication methods and systems.

BACKGROUND

With the advent of electronic commerce, consumers are increasingly purchasing products and services using cashless payment, such as credit cards, debit cards, and the like. Conventional authentication methods rely on matching a credit card number with a cardholder's account number and determining whether the transaction is authorized. Some conventional authentication methods also rely on authentication protocols, such as entering a pin code at a point of sale (POS) terminal. However, conventional authentication methods are static and outdated. As a result, a cyber attacker may spoof a payment information (e.g., credit card number) or have an unauthorized access to a cardholder's pin code. Using this information, a cyber attacker may easily facilitate an unauthorized transaction. Conventional authentication methods also fail to provide adequate security for a fraudster in physical possession of a cardholder's payment card. For instance, if a fraudster physically possesses a payment card, the fraudster may easily use any POS terminal to facilitate a transaction. Therefore, conventional authentication/authorization methods are inadequate and outdated.

SUMMARY

For the aforementioned reasons, there is a need to reduce risk of fraudulent activity associated with electronic transactions. There is a need for a new software solution to automatically and securely authenticate the user and authorize the transaction, without interfering with the flow of data. Disclosed herein are systems and methods capable of addressing the above-described technical shortcomings. The methods and systems described herein may also provide any number of additional or alternative benefits and advantages. As described herein, embodiments of the present disclosure relate to systems, apparatuses, methods, and computer program products for authenticating electronic transactions.

In an embodiment, a method comprising in response to receiving, from an electronic terminal, an authorization request corresponding to authorization of a payment associated with a payment card in communication with the electronic terminal, identifying, by a server, an electronic device of a user associated with the payment card; transmitting, by the server, an instruction to the electronic device to cause a radio frequency identification (RFID) reader of the electronic device to determine whether an RFID tag embedded in the payment card is located within a predetermined proximity to the electronic device; when the payment card is located within the predetermined proximity to the electronic device, executing, by the server, a first authentication protocol; and when the payment card is not located within the predetermined proximity to the electronic device, executing, by the server, a second authentication protocol that is more restrictive than the first authentication protocol, wherein the server transmits an authentication prompt to the electronic device requesting the user to enter an authentication response.

In another embodiment, a system comprises an electronic terminal configured to initiate an authorization request associated with a payment card of a user and a server in communication with the electronic terminal, the server configured to in response to receiving, from the electronic terminal, the authorization request to authorize payment via the payment card, identify an electronic device of the user associated with the payment card; transmit an instruction to the electronic device to cause an RFID reader of the electronic device to capture RFID identification information of RFID tags in proximity to the RFID reader and transmit, using the electronic device, the captured RFID tags to the server; determine, based on the captured RFID tags, whether an RFID tag on or in the payment card is located within a predetermined proximity to the electronic device; in response to determining that the payment card is located within the predetermined proximity to the electronic device, execute a first authentication protocol; and in response to determining that the payment card is not located within the predetermined proximity to the electronic device, execute a second authentication protocol that is more restrictive than the first authentication protocol, wherein the server transmits an authentication prompt to the electronic device requesting the user to enter an authentication response.

In yet another embodiment, a payment card comprises a card body; an RFID chip coupled to or embedded within the card body and storing a unique number associated with a user of the payment card; an antenna layer coupled to the RFID chip, the RFID antenna being configured to communicate the unique number to an RFID reader of an electronic device of the user as an authentication step for the payment card; and a chip disposed on the card body and storing data on one or more integrated circuits, the chip being configured to communicate with a point-of-sale terminal to initiate a payment using the payment card when the chip is physically inserted within the point-of-sale terminal.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Reference will now be made to the illustrative embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Various embodiments described herein relate to an RFID payment authentication system and method that aims to provide a more efficient and secure technique for authenticating a payment card of a user at a point-of-sale terminal using an RFID tag of a payment card as an authentication for the payment card transaction. By capturing the RFID tag and location information for an electronic device (e.g., a mobile device, a mobile phone registered or associated with a user), the system can determine that the payment card and the electronic device are co-located (e.g., in close proximity to one another) as part of authentication. In an embodiment, the electronic device includes the RFID reader, and the location information is determined based on the RFID tag of the payment card being in range of the RFID reader. The system and method described herein may include a system server that executes an authentication application, which may perform steps for the authentication of the user and the payment card used to perform the transaction using the RFID information associated with the payment card within the user profile of the user. Additionally, the authentication application may facilitate a transfer of payment associated with the transaction based on a successful authentication of the user and the payment data of the payment card used to perform the transaction at the point-of-sale terminal.

Figure 1A:
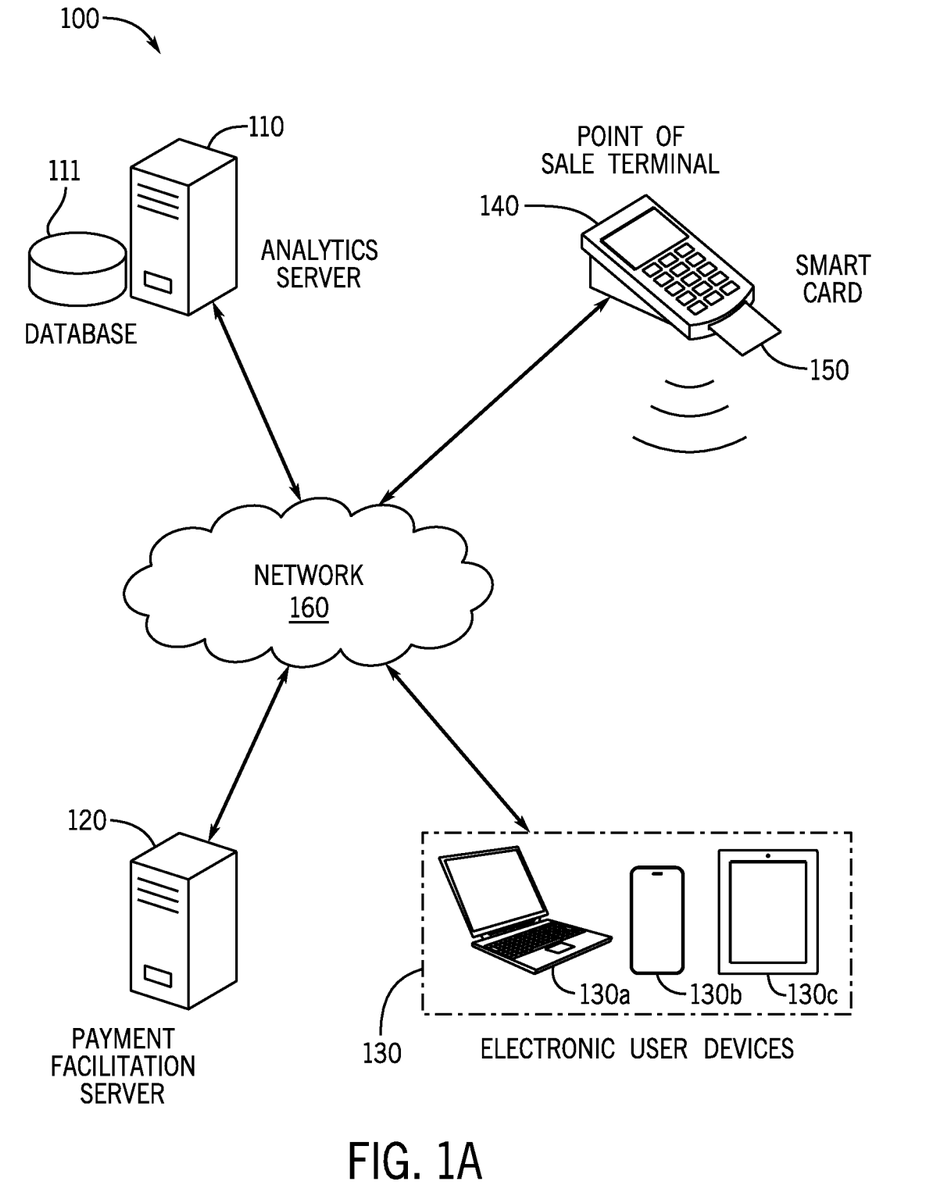
FIG. 1A illustrates components of a computer system for RFID-enabled authentication and authorization, according to an embodiment.

FIG. 1 illustrates components of a system 100 for RFID-enabled authentication and authorization, according to an embodiment. The system 100 may include analytics server 110, database 111, payment facilitation server 120, electronic user devices 130a-c (collectively electronic user devices 130), POS terminal 140, and smart card 150. In some configurations, the above-described features are connected to each other through a network 160. The examples of the network 160 may include, but are not limited to, private or public LAN, WLAN, MAN, WAN, and the Internet. The network 160 may include both wired and wireless communications according to one or more standards and/or via one or more transport mediums.

The communication over the network 160 may be performed in accordance with various communication protocols such as Transmission Control Protocol and Internet Protocol (TCP/IP), User Datagram Protocol (UDP), and IEEE communication protocols. In one example, the network 160 may include wireless communications according to Bluetooth specification sets, or another standard or proprietary wireless communication protocol. In another example, the network 160 may also include communications over a cellular network, including, e.g. a GSM (Global System for Mobile Communications), CDMA (Code Division Multiple Access), EDGE (Enhanced Data for Global Evolution) network.

The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110, one having skill in the art would appreciate that in some embodiment, the analytics server 110 may include any number of computing devices operating in a distributed computing environment.

As will be described below, the analytics server 110 may be operatively connect (or otherwise in communication with) the database 111. The analytics server may communicate with the database 111 to retrieve user data. For instance, the analytics server 110 may retrieve identification of an electronic device associated with the smart card 150. The analytics server 110 may also retrieve a profile of the user to match a pin code received to a pin code known to be associated with the user to authorize the transaction. As will be described below, the analytics server 110 may be in communication with all the computing features/devices illustrated in FIG. 1 to authenticate and authorize a transaction using smart card 150.

The database 111 may be capable of storing user profiles containing user's demographic data, users' associated electronic devices (also referred to as authorized user devices), payment information, smart card information, authentication passcodes, authentication preferences, and the like. The database 111 may be in communication with a processor of the analytics server 110 and/or the electronic user devices 130, where the processor is capable of executing the various commands of the system 100. In some embodiments, the database 111 may be part of the analytics server 110 or the electronic user devices 130. In some embodiments, the database 111 may be a separate computing feature/component in communication with the analytics server 110. In some configurations, the database 111 may be a part of the analytics server 110.

The database 111 may be hosted on any number of computing devices comprising a non-transitory machine-readable storage medium and capable of performing the various tasks described herein. As shown in FIG. 1, the database 111 may be accessed by the analytics server 110, the electronic user devices 130, and/or other servers/devices of the system 100 via the network 160. The database 111 may be hosted on the same physical computing device functioning as the analytics server 110 and/or the electronic user devices 130.

In some embodiments, the database 111 may have logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytics server 110.

The payment facilitation server 120 may be any computing device connected to a financial institution associated with the smart card 150. In a non-limiting example, the payment facilitation server 120 may be a bank server. The payment facilitation server 120 may receive transaction data (e.g., payment card information and/or payment amount) and may retrieve an account associated with the payment card. The payment facilitation server 120 may then determine whether debiting the payment amount from the identified account is authorized. For instance, the payment facilitation server 120 may determine that a $1000 transaction is not authorized because the cardholder (associated with the smart card 150) does not have a credit limit that can enable a $1000 transaction.

The electronic user devices 130 may be any portable or non-portable device, such as a desktop computer, laptop computer, tablet computer, smart phone, smart watch, gaming console, personal digital assistant, and the like. The electronic user devices 130 may be any computer with a processor/microcontroller and/or any other electronic component that performs one or more operations according to one or more programming instructions. The electronic user devices 130 may be capable of communicating with the analytics server 110 (directly or through a browser or an application, e.g., an app, installed) through the network 160 using wired or wireless communication capabilities.

In some configurations, the electronic user devices 130 may be in communication with a radio frequency identifier (RFID) module configured to monitor for RFID tags being broadcasted by other RFID modules (e.g., transmitters). In some configurations, the RFID module of the electronic user devices 130 may also transmit its own RFID tags in accordance with predetermined specifications, frequencies, and ranges.

In some configurations, the electronic user devices 130 may be an especially designed electronic device to implement a secure transaction as described herein. For instance, the electronic user devices 130 may include an electronic device designed for authenticating payments with the smart card 150. For instance, an RFID module may be embedded into a wearable device.

In some configurations, the electronic user devices 130 may be devices that are used and repurposed to perform the functionality described herein. For instance, the electronic device 130*b* may be a smart phone that could be used for purposes other than the functionality described herein (e.g., browsing the web, telephonic communication, and navigation). However, the electronic device 130*b* can be repurposed (e.g., enabled with an RFID transmitter/reader) to perform the methods and systems described herein.

The point of sale terminal (POS terminal 140) may be any electronic and/or computing device configured to acquire payment card identifier from a payment card, such as the smart card 150. The POS terminal 140 may use a variety of existing methods such as a magnetic stripe located within or attached to the payment card and/or near field communication (NFC) to acquire payment information from a payment card (e.g., credit card, debit card) or other electronic payment methods (e.g., NFC enabled wearable payment devices).

Figure 2A:
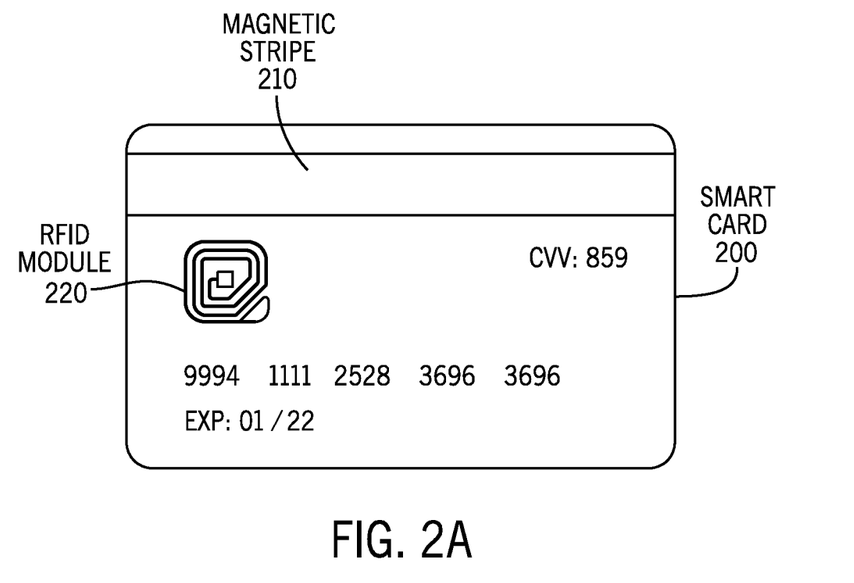
FIGS. 2A-D illustrate non-limiting examples of RFID-enabled payment cards, according to an embodiment.

The POS terminal 140 may acquire payment information (e.g., unique payment number or credit card number) of a user and transmit the payment information along with an authorization request to a server, such as the analytics server 110 or the payment facilitation server 120. The payment facilitation server 120 may then retrieve user's payment information using the payment information received from the POS terminal 140 and authorize (or deny) payment to the user. The smart card 150 may be any payment card that is enabled with an RFID module (e.g., chip) or any other location-tracking device. An example of the smart card 150 is depicted in FIG. 2.

As depicted in FIG. 2A, the smart card 200 (similar to the smart card 150 in FIG. 1) may be a part of a payment system issued by financial institutions (e.g., bank, credit card issuer, payment facilitation server 120, and/or the analytics server 110 as described in FIG. 1) to a user. The smart card 200 may enable the user to access funds in his or her bank account or line of credit. The smart card 200 may be electronically linked to an account or accounts belonging to the user. These accounts may be hosted and/or operated by the payment facilitation server and/or the analytics server. These accounts may be deposit accounts, loan, or credit accounts, and the smart card 200 may be utilized for accessing those funds.

As depicted in FIG. 2A, the smart card 200 may contain a unique payment/card number and some security information, such as an expiration date or card verification value (CVV). This unique payment information may be embedded within a magnetic stripe 210 on the back enabling various machines (e.g., POS terminal) to read and access the payment information. The magnetic stripe 210 of the smart card 200 may be capable of storing data (e.g., user's account number) by modifying the magnetism of iron-based magnetic particles on a band of magnetic material of the smart card 200. The magnetic stripe 210 may interact with a magnetic reading head of the POS terminal to convey the payment information to the POS terminal. For instance, when the smart card 200 placed near the POS terminal, a magnetic reading head of the POS terminal may retrieve payment information of the smart card 200, such as the user's account number or other unique identifiers linked to an account of the user operating the smart card 200.

The smart card 200 may also be enabled (e.g., in communication with) an RFID module 220, which may include a transmitter/receiver. The RFID module 220 may include an RFID chip or transmitter and antennas that broadcast RFID identifiers to announce its location to a corresponding RFID receiver. The RFID module 220 may use electromagnetic fields to automatically identify and track tags attached to objects. The RFID identifiers may contain electronically stored information that is unique to the smart card 200. For instance, an RFID identifier broadcasted by the RFID module 220 may have a number (or an alphanumerical string) that is unique to the smart card 200.

The RFID module 220 may include passive or active RFID tags. A passive tag may collect energy from a nearby RFID reader's interrogating radio waves. In contrast, an active tag may have a local power source (e.g., battery). When the smart card 200 is enabled with a passive tag, the smart card 200 may not include a power source and the RFID module 220 may be activated or may draw its power from an RFID receiver, for example, RFID receiver installed onto an electronic user devices or a POS terminal. Accordingly, when the smart card 200 is enabled with an active RFID tag, the smart card 200 may also include a local battery source or an integrated circuit providing the RFID module 220 with the needed power to broadcast its unique identifiers. The smart card 200 may have active and/or passive RFID tags. Therefore, the methods, systems, and embodiments described herein generically refer to passive and active RFID tags as tags and/or RFID tags or RFID module. These tags (or any other part of the RFID module 220) may be attached to the smart card 200 during production of the smart card 200 or can be retroactively attached to the smart card 200.

The RFID system described herein may use tags or labels attached to the smart card 200 to identify whether a location of the smart card 200 is within a predetermined proximity to a predetermined object. An RFID reader and/or transmitter attached to the predetermined object may communicate with the RFID tag attached to the smart card 200 and identify whether the location of the smart card 200 is within a predetermined proximity (e.g., 5 ft. or 10 ft.). The RFID module 220 may include one-way or two-way RFID tags. A one-way RFID tag may only transmit (or receive) signals while a two-way RFID tag, other known as an "interrogator," may send and receive signals to other RFID tags and read its response.

As described above, RFID tags may be either passive, active, or battery-assisted passive. An active tag may have an on-board battery and may periodically transmit its ID signal. A battery-assisted passive RFID tag may be activated when in the presence of an RFID reader. A passive tag may use the radio energy transmitted by the RFID reader. The smart card 200 may utilize any type (or a combination of) the RFID tags described herein.

RFID tags may either be read-only, having a factory-assigned serial number that is used to identify the tag or the object corresponding to the tag, or may be read/write (e.g., where object-specific data can be written into the RFID tag by the system user, such as the analytics server). The smart card 200 may utilize any type (or a combination of) the tags described herein.

In some configurations, the RFID tags may contain three parts: an integrated circuit that stores and processes information and that modulates and demodulates radio frequency (RF) signals; a module to collect DC power from the incident reader signal or a local battery source; and an antenna for receiving and transmitting the signal. In some configurations, an RFID chip may perform the first two functionalities. The RFID tag may include either fixed or programmable logic for processing the transmission and sensor data, respectively.

Figure 2B:
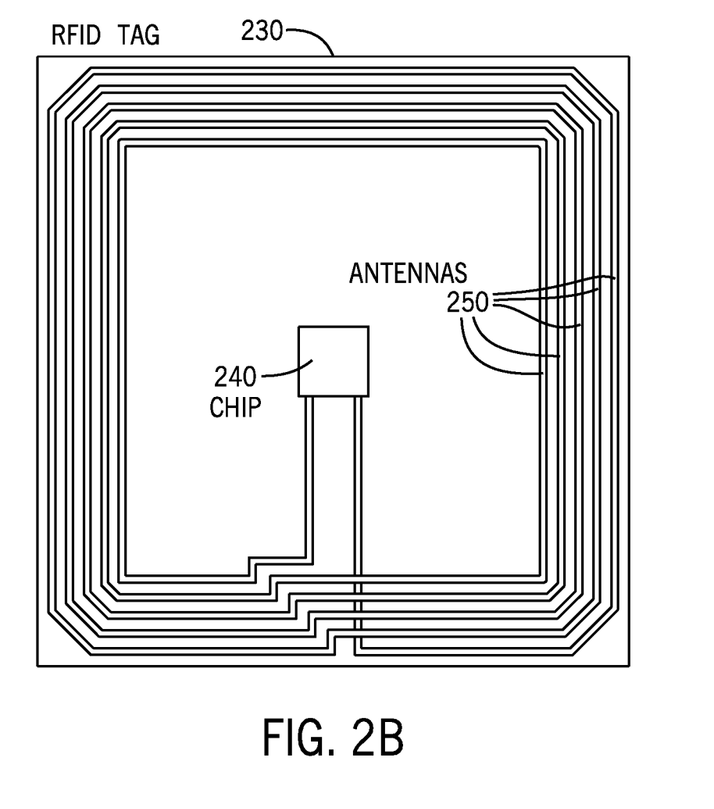

Referring now to FIG. 2B, different components of an RFID tag are described, in accordance with an embodiment. As described above, RFID tags can be embedded and/or attached to all items that are to be tracked, such as the smart card 200. The RFID tag 230 may comprise the RFID chip 240 that is connected to the RFID antenna 250. The RFID chip 240 may contain memory, which stores the unique identifier of the smart card 200 (e.g., user's unique number, user's account number, a unique identifier of the smart card, or any other variable information that can be read and tracked by RFID readers of the user's electronic device).

The RFID antennas 250 may propagate the RFID wave in both vertical and horizontal dimensions. The field coverage of the wave and its signal strength may be partially controlled by the number of degrees that the wave expands as it leaves the antenna. While the higher number of degrees may mean a bigger wave coverage pattern, it could also mean lower strength of the signal. Passive RFID tags may utilize an induced antenna coil voltage for operation. This induced AC voltage is rectified to provide a voltage source for the device. As the DC voltage reaches a predetermined level, the RFID tag 230 may start operating. By providing an energizing RF signal, a reader can communicate with a remotely located device that has no external power source such as a battery.

The RFID antennas 250 may collect energy and channel it to the RFID chip 240 to activate the RFID chip 240. Generally, the larger the tag antennas' 250 area, the more energy they will be able to collect and channel toward the RFID chip 240, and the further read range the RFID chip 240 will have. The RFID antennas 250 can be made from a variety of materials; they can be printed, etched, or stamped with conductive ink, and/or vapor deposited. The RFID antennas 250 may not only transmit the wave carrying the information associated with the RFID tag 230, but may also need to catch the wave from the reader to supply energy for the RFID tag 230 operation. In most cases, the RFID antennas 250 may have omnidirectional radiation or hemispherical coverage.

Figure 2C:
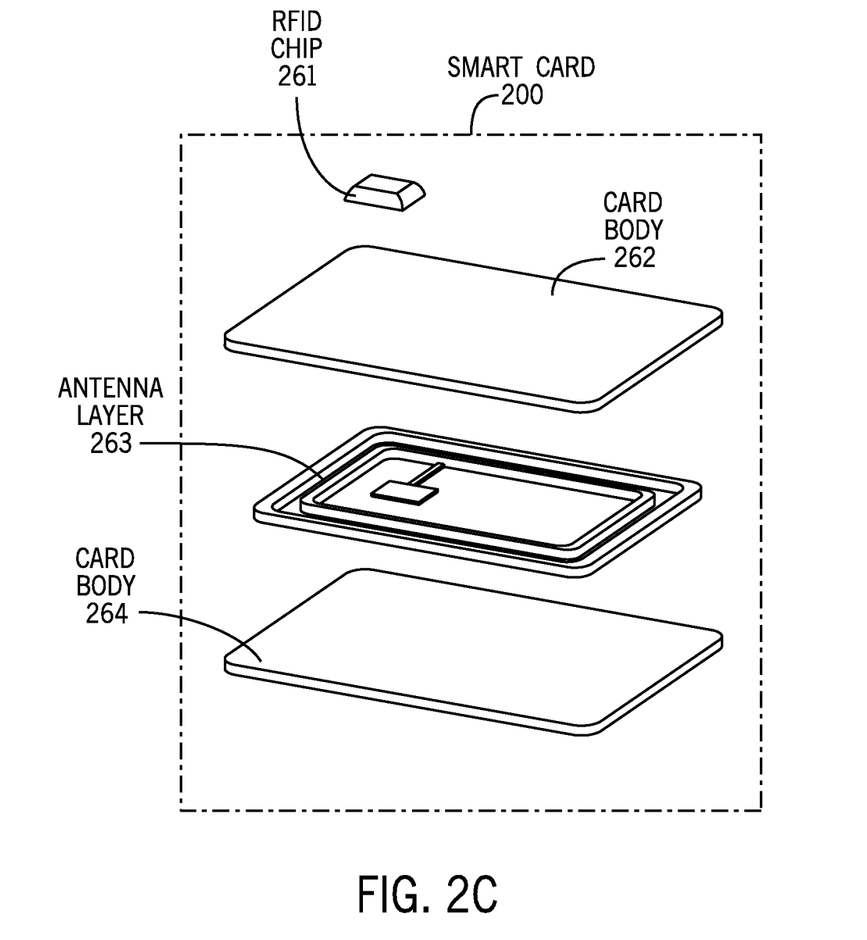

In one configuration, the RFID module 220 may be retroactively attached to a payment card, such as the smart card 200. In some embodiments, the RFID module 220 may also be embedded within the smart card 200, as depicted in FIG. 2C, which illustrates a non-limiting example of design of the smart card 200 having multiple layers. For instance, the smart card 200 may have three layers, as depicted. The card body layers may be any polycarbonate body designed to protect the RFID tag, the antenna layer, and the integrated circuit layer. The body layers may be printed with promotional or other bank-specific material/logos. As depicted, the RFID chip 261 (similar to the RFID chip 240) may be attached in the outer portion of the card body 262. Furthermore, the antenna layer (e.g., an integrated circuit where RFID antennas, similar to the RFID antennas 250, are etched or printed) may be placed between the card body 262 and 264. As depicted, the RFID module 220 can be embedded within the smart card 200 during the production of the smart card 200.

In operation, an RFID reader may transmit an encoded radio signal to interrogate all RFID tags nearby. An RFID tag nearby (e.g., RFID module 220) may then receive the message and may respond with its identification and other information. This information may include a unique serial number, or a unique number associated with the user (e.g., cardholder) or the smart card 200. In some other configurations, the RFID module 220 may continuously broadcast signals where the signal may be received and processed by an RFID reader.

In some configurations, the RFID module described herein may be integrated into other authorization and authentication devices using. For instance, a smart card may be enabled with an EMV (Europay, MasterCard, and Visa) module. The EMV module may include an EMV chip that may store data on one or more integrated circuits in addition to magnetic stripes (for backward compatibility). The EMV chip may authenticate the cardholder when the payment cars is physically inserted into a reader (e.g., POS terminal), as well as contactless cards that can be read over a short distance using near-field communication (NFC) technology. The EMV module of a smart card may be an existing authentication technology and may include various sub modules. For instance, the EMV module may also include a printed or etched integrated circuit with multiple layers (e.g., data, application, operating system, input/output systems, and hardware). These layers may work together to authenticate the cardholder.

Figure 2D:
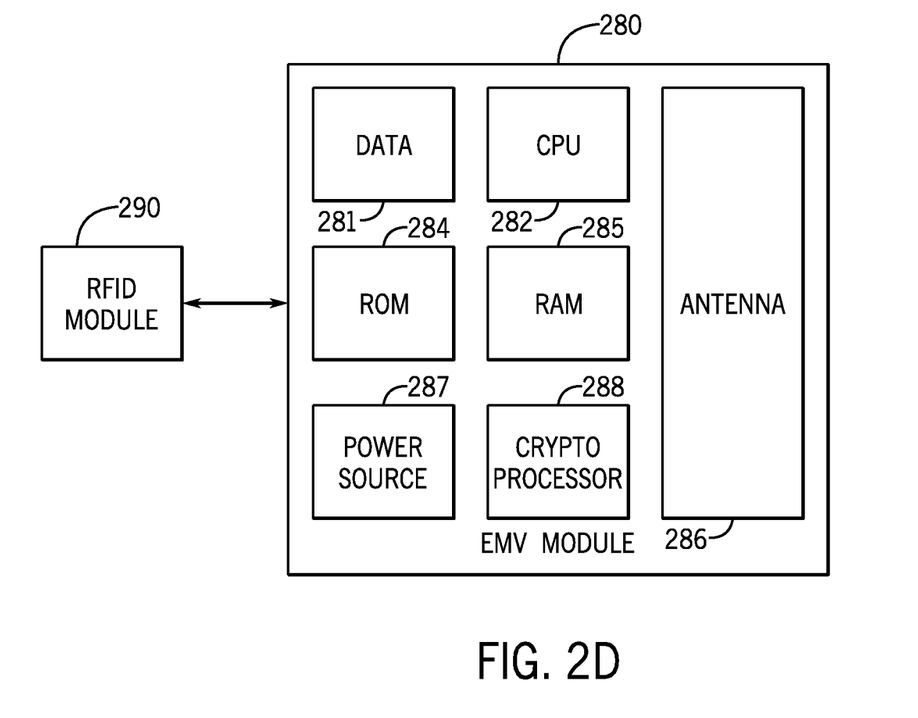

As depicted in FIG. 2D, the RFID capabilities described herein can be integrated into and/or work in conjunction with an EMV chip functionality. For instance, the RFID module 290 (similar to the RFID module 220) may utilize its power from circuitry enabling the EMV module 280. For instance, the RFID module 290 may share or partially use the same integrated circuit used by the EMV module 280. In some configurations, the RFID module 220 may integrate with one or more sub-modules (e.g., stored data 281, CPU 282, antenna 283, ROM 284, RAM 285, power source 287, and/or crypto processor 288) of the EMV module 280 to retrieve a unique identifier or other payment information and broadcast the data retrieved in accordance with the methods described herein.

Referring back now to FIG. 1A, the RFID reader may be installed on (or otherwise in communication with) the electronic user devices 130. In some embodiments, the functionality of the RFID readers may be carried out by a mobile application installed onto the electronic user devices 130. Even though some embodiments described herein describe the RFID reader to be installed (or otherwise in communication with) the electronic user devices 130, the RFID readers are not limited to be installed onto the electronic user devices 130. For instance, in some configurations, the RFID readers may be installed in a predetermined location (e.g., a specific store).

In some configurations, the RFID module 170 of the smart card 150 may continuously broadcast its unique serial number, which is then captured by an RFID receiver (or reader) of the electronic user devices 130. In some configurations, the RFID reader of the electronic user devices 130 may interrogate the RFID module 170, which causes the RFID module 170 to broadcast its serial number to the RFID reader. In some other configurations, the RFID module 170 may be only broadcast its serial number when near the POS terminal 140. The analytics server 110 may use one or a combination of these non-limiting examples to determine whether the smart card 150 is within a predetermine proximity to the electronic user devices 130.

Figure 1B:
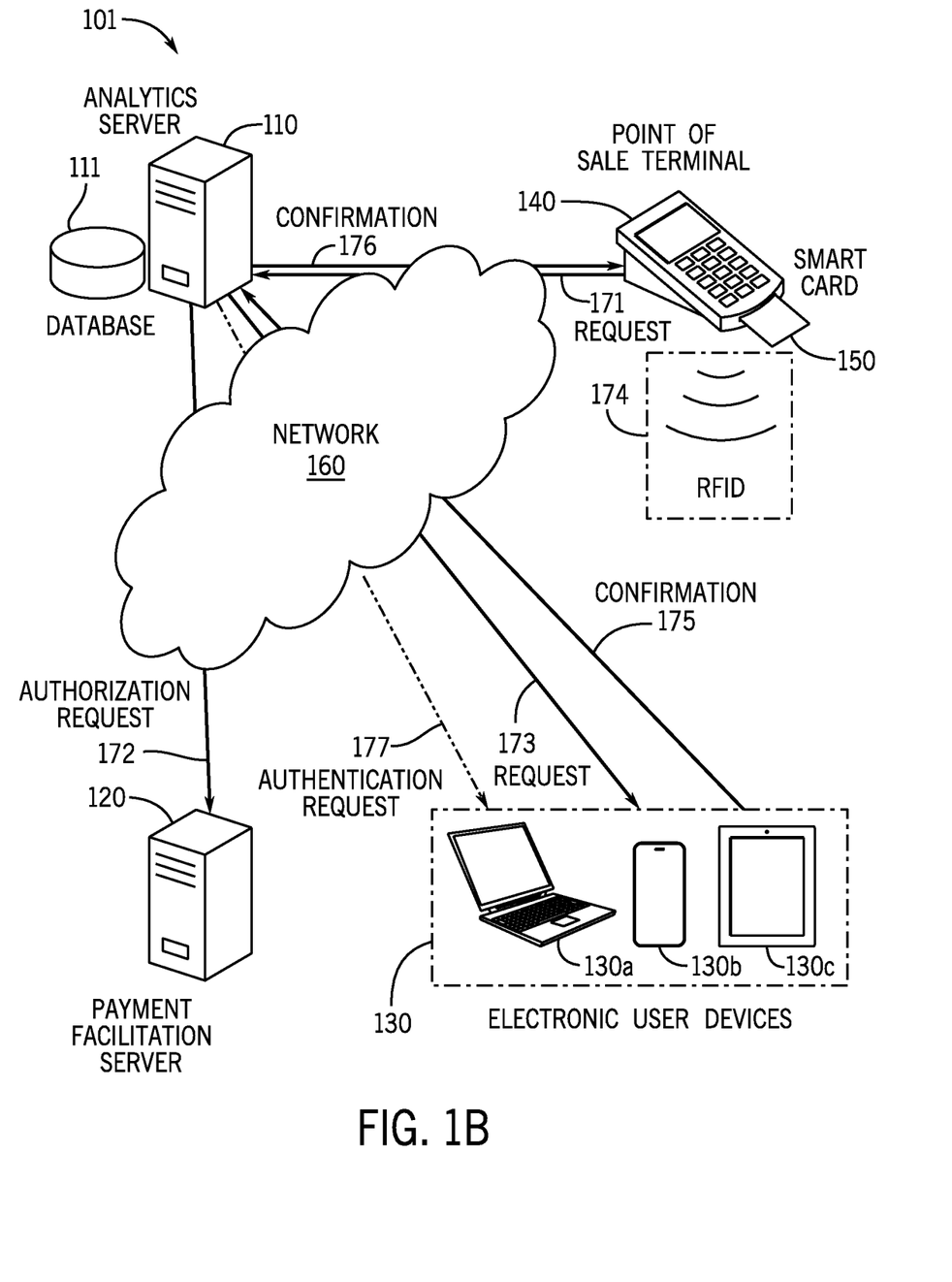
FIG. 1B illustrates a non-limiting example of the operation of the method and computer system for RFID-enabled authentication and authorization, according to an embodiment.

FIG. 1B illustrates a non-limiting example of the operation of a method and computer system for RFID enabled authentication and/or authorization, according to an embodiment. The computing features illustrated in FIG. 1B are similar to the ones described in FIG. 1A. However, these features (e.g., network 160) are rearranged for ease of understanding and clarity. The methods and systems described in FIG. 1B do not deviate from the methods and systems described in FIG. 1A.

In the non-limiting example 101, a user initiates a payment request (e.g., transaction) by inserting his or her smart card 150 into the POS terminal 140. Using a magnetic reader module, the POS terminal 140 retrieves payment information (e.g., smart card number or account number of the user from the smart card 150. The POS terminal 140 then transmits the request 171 to the analytics server 110. The request 171 comprises the payment information retrieved from the smart card 150, the amount of payment to be authorized, and any other relevant transaction and/or payment data (e.g., time stamp and/or location of the transition). Additionally or alternatively, the request 171 may also include a request for payment authorization (e.g., authorization to debit an account of the user) from the payment facilitation server 120.

Upon receiving the request 171, the analytics server 110 may transmit a request 172 to the payment facilitation server 120. The request 172 may comprise the payment information received from the POS terminal 140. For instance, the request 172 may request the payment facilitation server 120 to authorize a transaction for $20 by debiting an account number 1234 that corresponds to the number retrieved from the smart card 150.

The analytics server 110 may also use the payment information (or user information) received from the POS terminal 140 to retrieve a list of authorized electronic devices associated and/or operated by the user (i.e., electronic user devices 130). The analytics server 110 may transmit the request 173 to the electronic user devices 130. The request 173 may cause an RFID reader installed onto (or otherwise in communication with) the electronic user devices 130 to monitor for RFID tags within a predetermined proximity. As a result, RFID reader of the electronic user devices 130 monitors RFID tags and receives RFID tag 174 (e.g., a unique number associated with the RFID tag near the electronic device.)

Upon receiving the RFID tag 174, the electronic user devices 130 may transmit the confirmation 175 to the analytics server 110. The confirmation 175 may comprise RFID tag 174 and a distance between the RFID tag 174 and the electronic user devices 130. When the analytics server 110 receives the confirmation 175, the analytics server 110 determines whether the RFID tag 174 matches the unique number of the smart card 150. If the RFID tag 174 belongs to the smart card 150, and the smart card 150 is within a predetermined proximity to the electronic devices' RFID reader, the analytics server 110 may transmit confirmation 176 to the POS terminal 140 causing the POS terminal 140 to facilitate the transaction (e.g., the payment is authorized). In some configurations, the analytics server 110 only authorizes the transaction if the above-described conditions are satisfied and the payment facilitation server 120 further confirms that the user's account has sufficient funds.

In some embodiments, the analytics server 110 may utilize an additional layer of security before authorizing the transaction. For instance, the analytics server 110 may send the authentication request 177 to the electronic user devices 130 requesting the user to enter a passcode. The analytics server 110 may utilize this two-factor multi-channel authentication method before transmitting the confirmation 176 to the POS terminal 140. As illustrated in FIG. 1B, authentication request 177 is depicted in dashed lines, which represents that the two factor authentication may be optional. For instance, the analytics server 110 may only utilize the two-factor authentication method described herein for transaction satisfying a predetermined condition (e.g., satisfying a payment amount threshold).

Figure 3:
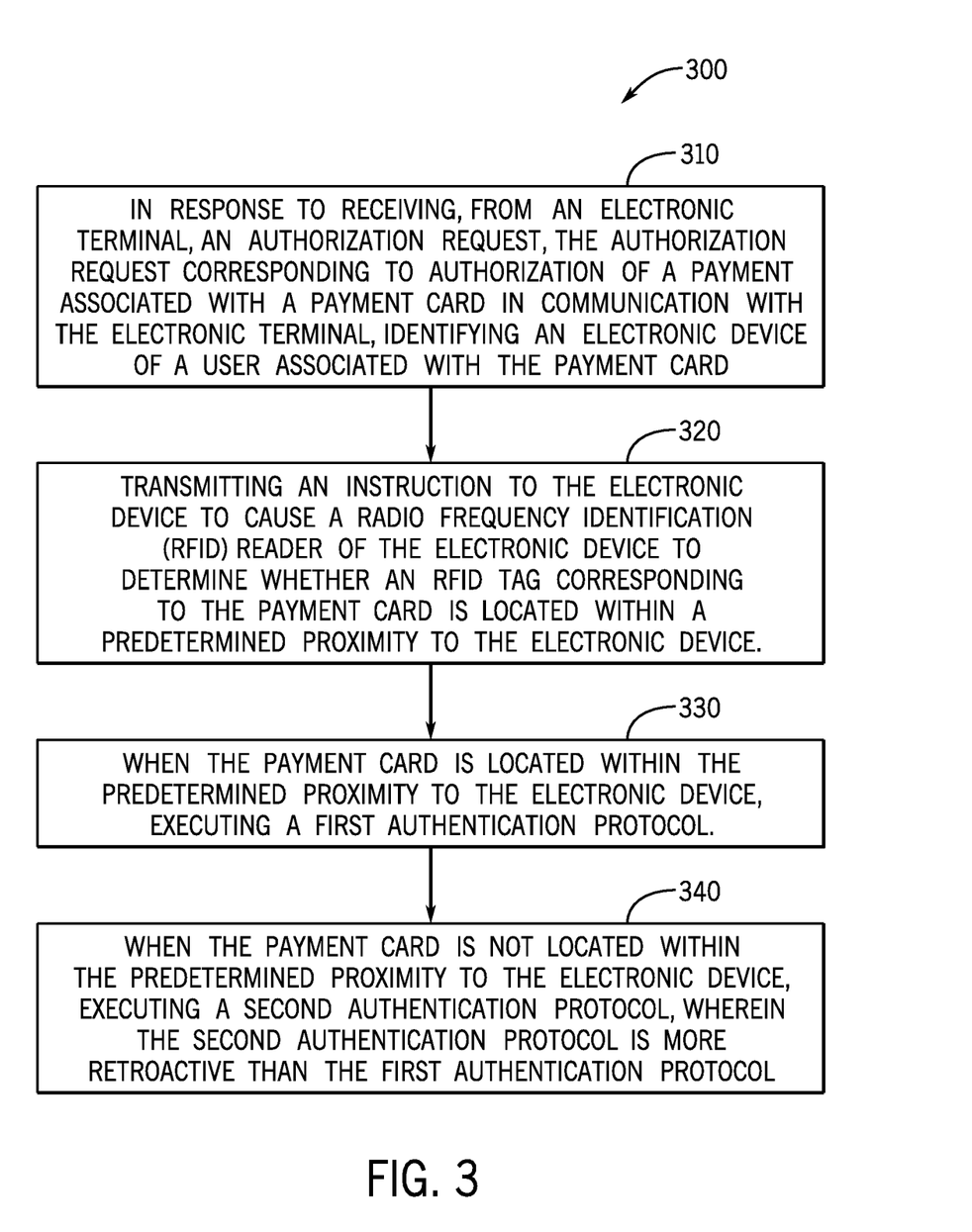
FIG. 3 is a flow diagram of an illustrative process/method for RFID-enabled authentication and authorization, according to an embodiment.

FIG. 3 illustrates execution steps of a method 300 for RFID enabled authentication and/or authorization, according to an embodiment. The method 300 comprises execution steps 310-340. However, other embodiments may comprise additional or alternative execution steps, or may omit one or more steps altogether. Other embodiments may perform certain execution steps in a different order; steps may also be performed simultaneously or near-simultaneously with one another.

The method 300 is described as being executed by a single analytics server computer. However, in some embodiments, various steps may be executed by any number of computing devices operating in a distributed computing environment. In some configurations, a computer executing one or more steps may be programmed to execute various other unrelated features where such computer does not need to be operating strictly as the analytics server described herein. Furthermore, each step and embodiment described herein can be combined with other steps and embodiments.

At the 310, the analytics server may, in response to receiving, from an electronic terminal, an authorization request corresponding to authorization of a payment associated with a payment card in communication with the electronic terminal, identify an electronic device of a user associated with the payment card.

The analytics server may receive a payment authorization/authentication from an electronic terminal. As described above, an electronic terminal may be any terminal configured to facilitate a transaction by receiving payment information from a payment card and authenticating the ca holder's payment information. Electronic terminals are not limited to POS systems. In some embodiments, an electronic device (e.g., smart phone) can be configured or retrofitted to facilitate a transaction similar to a POS terminal. For instance, software and/or hardware may be installed on a mobile phone that enable the mobile phone with the same functionality as a POS terminal. In some configurations, the request may be received from a server connected to a POS terminal. For instance, a server operatively connected to a POS terminal or the mobile device acting as a POS may transmit the request the analytics server.

In some configurations, the analytics server may receive the request from a server hosting a website configured to provide goods and services. For instance, an online shopping website may receive a cardholder's payment information and transmit a payment authorization/authentication request to the analytics server.

As described above, the smart card may be any payment card enabled with a location-tracking device. For instance, the smart card may be a credit card, debit card, or any other payment card that has an RFID transmitter and/or reader (RFID module). The RFID module may be configured to transmit RFID tags having a unique number associated with the smart card. The unique number may be any character (e.g., alphanumerical value) unique to the smart card. In that way, the analytics server can identify a location of the smart card by determining that the smart card is within a predetermined proximity to an RFID reader associated (or other in communication with) the analytics server.

The payment authorization may include payment information of a smart card. Payment information may be any identification information that the electronic terminal retrieves from the smart card. Non-limiting examples of a payment information may include credit card number, account number, or any other number that corresponds to the cardholder's financial account.

In a non-limiting example, a cardholder initiates a payment by inserting his smart card (e.g., RFID enabled credit card) into a POS terminal. The POS terminal may then retrieve the smartcard's payment information (e.g., credit card number) via the smart card's magnetic stripe. The POS may then generate a request to authenticate the user and authorize the payment. The POS terminal may then transmit the request to the analytics server. The request may comprise the credit card number, a time stamp of the transaction, and/or the payment amount.

When the analytics server receives the payment request from the electronic terminal, the analytics server may parse the request and identify one or more electronic devices associated with the payment information contained within the request (e.g., authorized electronic devices). For instance, the analytics server may parse the request received from the electronic terminal to identify the credit card number. The analytics server may then query a database (e.g., internal, external, or hosted by a third party) using the credit card number. The analytics server may then retrieve a table that includes identifiers of a list of authorized electronic devices. The authorized electronic devices correspond to a list of devices that are known to be associated with a cardholder. A cardholder may update the list by adding an identifier of the electronic devices to a list hosted by the analytics server. For instance, a cardholder may access a website hosted by the analytics server to update his or her profile. The cardholder may then interact with the website to create a list of authorized electronic devices.

An identifier, as used herein, may refer to any unique identifier allowing the analytics server to identify and contact the electronic device. Non-limiting examples of an identifier may include MAC address, telephone number, a unique identifier of an application installed on a mobile device, and the like. As will be described below, the analytics server may use the identifier to communicate with the electronic device. For instance, the analytics server may send a text message and/or initiate a call using a telephone number of the user's mobile device. The analytics server may also identify the user's mobile device (MAC address) and send a push notification to the mobile device using an application installed onto the mobile device.

At step 320, the analytics server may, transmit an instruction to the electronic device to cause an RFID reader of the electronic device to determine whether an RFID tag corresponding to the payment card is located within a predetermined proximity to the electronic device.

Upon identifying one or more authorized electronic devices and their identifiers, the analytics server may then transmit an instruction to the authorized electronic device to determine whether the authorized electronic device is near the smart card. The analytics server may generate and transmit an instruction to the authorized electronic devices where the instruction activates an RFID reader of (e.g., installed on or otherwise in communication with) the authorized electronic devices. The instruction further causes the RFID reader of the authorized electronic devices to monitor for RFID tags within range of the RFID reader. As a result, the RFID reader of the authorized electronic devices collects RFID tags transmitted (broadcasted) and transmits the RFID tags to the analytics server using communication circuitry of the electronic device.

Upon receiving the instruction from the analytics server, the authorized electronic device (via its RFID reader) collects and transmits all RFID tags received to the analytics server. Upon receiving the RFID tags from the authorized electronic devices, the analytics server then queries a database to determine whether the stored RFID tag information for the smart card (i.e., the smart card having the payment information received within the request in the step 310) matches the RFID tag received from the authorized electronic device.

As described above, in some configurations, RFID readers associated with one or more authorized electronic devices may already be activated. For instance, the RFID readers may continuously collect RFID tags received. In those embodiments, the instruction may cause the RFID reader to transmit the RFID tags received (along with any location identification information) to the analytics server.

Using the methods and systems described above, the analytics server determines whether the smartcard used to initiate the transaction is located near at least one known and authorized electronic device associated with the smart card's true owner.

At step 330, when the payment card is located within the predetermined proximity to the electronic device, the analytics server may execute a first authentication protocol.

Upon the RFID tag received from the authorized electronic device matching the RFID tag of the smart card, the analytics server determines that the smart card initiating the transaction is within a predetermined proximity to at least one authorized electronic device known to be associated with a user associated with the smart card. If the analytics server determines that the smart card is within a predetermined proximity to at least one authorized electronic device, the analytics server may execute a first authentication protocol and/or cause the electronic terminal to execute the first authentication protocol.

The first authentication protocol may be any predetermined authentication protocol. For instance, the analytics server may cause the electronic terminal to display a prompt asking the cardholder to enter a passcode. If the analytics server determines that the passcode matches the passcode for the smart card, the analytics server may then transmit a confirmation message to the electronic terminal indicating that the transaction is authorized.

In some configurations, the first authentication protocol may depend on various data received within the request (step 310). For instance, the analytics server may execute the first authentication protocol when the transaction exceeds a predetermined payment amount (e.g., $200). For instance, when the analytics server determines that the smart card is within the predetermined proximity to at least one authorized electronic device and when the payment amount is less than $200, the analytics server may automatically authorize the transaction without requiring the user to enter a secondary passcode.

At step 340, when the payment card is not located within the predetermined proximity to the electronic device, the analytics server may execute a second authentication protocol, wherein the second authentication protocol is more restrictive than the first authentication protocol.

When the analytics server determines that the smart card is not within the predetermined proximity to the RFID reader of at least one authorized electronic device, the analytics server may execute a secondary authentication protocol. For instance, the analytics server may cause the electronic terminal to display a prompt using a passcode on the electronic device. In some configurations, the analytics server may cause one or more authorized electronic devices to display the prompt requesting a passcode. The analytics server may then match the passcode by the user to the passcode associated with the smart card to authenticate the user and authorize the transaction.

In some configurations, the analytics server may use a multi-tiered hierarchical authentication systems where different actions may trigger different levels of authentication. For instance, when the analytics server identifies that a user's smartcard is located near the user's electronic device, the analytics server may execute a level I authentication method, such as asking for a four digit pin number and/or automatically authorizing the transaction. However, when the analytics server identifies that the user's smartcard is not near the user's electronic device, the analytics server may execute a level II authentication method, such as a multi-factor authentication, multichannel authentication, prompting for multiple pin numbers, prompting for additional security questions, and/or automatically denying the transaction. In the above example, the level II authentication method is a more restrictive authentication than level I. The analytics server may increase the restrictiveness of the authentication method in accordance with whether a smartcard is located near a user's electronic device.

Figure 4:
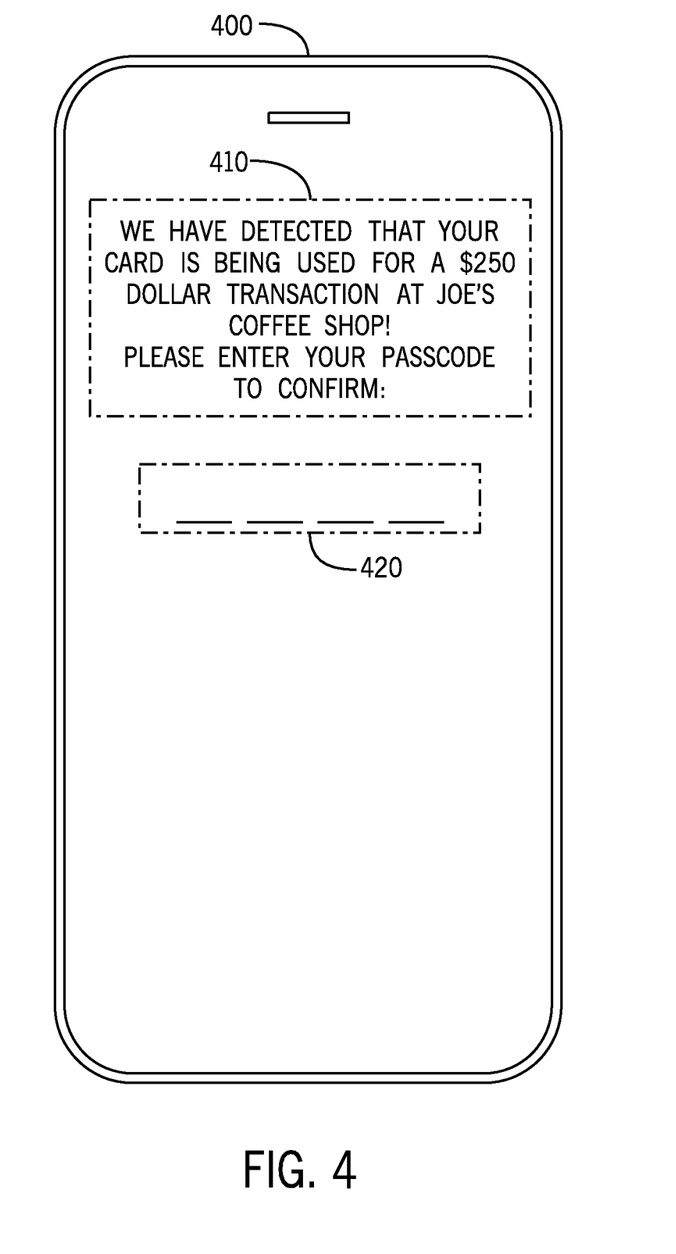
FIG. 4 illustrates a non-limiting example of a secondary device authentication, according to an embodiment.

As illustrated in FIG. 4, the analytics server may display prompt 410 on the mobile device 400. The prompt 410 informs that the user's card is being used for a transaction. For instance, the prompt 410 identifies the payment amount ($250) and identifying information regarding the electronic terminal (Joe's Coffee Shop). The analytics server may also display input element 420 allowing the user to input a passcode to approve the transaction.

In some configurations, the analytics server may utilize a biometric module of at least one authorized electronic device to authenticate the cardholder. For instance, the analytics server may display a prompt on the cardholder's mobile device requesting the user purporting to be the cardholder to provide a biometric sample (e.g., fingerprint and/or retina scan). The analytics server may then use the mobile device's existing biometric authentication to determine that the user operating the mobile device is the cardholder and the user has approved the transaction.

In some configurations, the analytics server also uses a secondary authorized electronic device's location to authorize the transaction. For instance, the analytics server may only authorize the transaction if the smart card is used within a predetermined proximity to a cardholder's mobile phone and his/her wearable watch. The analytics server may use RFID transmission technology or other location tracking technology to identify the location of the secondary authorized electronic device. In a non-limiting example, the analytics server may first determine whether the smart card is near a user's mobile phone, and then determine whether the smart card (or the mobile phone) is near the user's electronic wearable watch. When both of the above-described conditions are satisfied, the analytics server then authorizes the transaction.

NON-LIMITING EXAMPLE

In a non-limiting example, a user initiates an online transaction using an online shopping website. The user enters his credit card information including credit card number, expiration date, and CVV. A Web server of the online shopping website then transmits an authorization and authentication request to the analytics server. The request comprises the user's credit card number, expiration date, and CVV. The request also comprises an amount of the transaction (e.g., payment amount), identification information of the website, and a timestamp of the transaction.

Upon receiving the request, the analytics server querying the database using at least one of the credit card number, CVV, and the expiration date to identify the user associated with the credit card. Upon identifying the user associated with the credit card, the analytics server then retrieves a list of authorized electronic devices operated by the user. The analytics server identifies a mobile phone and a personal computer operated by the user as the authorized electronic devices. These electronic devices have been previously designated as authorized by the user.

As described above, the user's credit card, mobile phone, and personal computer are all enabled with an RFID transmitter/reader. Accordingly, the analytics server transmits an instruction to the user's mobile phone and personal computer to activate an RFID reader of the mobile phone. Additionally or alternatively, the RFID transmitter of the user's credit card continuously broadcasts RFID tags having a number unique to the user's credit card. Upon activation, the RFID reader of the user's mobile phone and personal computer capture the RFID tags broadcasted by the RFID transmitter of the user's credit card and transmit the RFID tags captured to the analytics server.

In some embodiments, the above-described methodology may also be used to broadcast a location of the smartcard. For instance, the location signal emitted by the user's credit card may also indicate the location of the credit card or a proximity of the user's credit card to the authorized electronic device.

Upon receiving an RFID tag from one or more authorized electronic devices, the analytics server matches the RFID tags with an RFID tag of the user's credit card. If the RFID tags received match a number of RFID tags associated with users' credit card, the analytics server determines that the user's credit card is within a predetermined proximity to at least one of the user's authorized electronic devices. Accordingly, the analytics server may automatically authorize the transaction and send an authorization confirmation message to the Web server. In some other embodiments, the analytics server may execute a lower-level authentication protocol. For instance, the analytics server may only ask for a four-digit passcode.

If the analytics server determines that the user's credit card is not within the predetermined proximity to at least one of the users authorized electronic devices, the analytics server may execute a higher-level authentication protocol. For instance, the analytics server may send a prompt to at least one of users authorized electronic devices requesting the user to enter a passcode (e.g., higher number of digits than the lower level authentication).

The selection of the lower or higher level of authentication protocol may also depend on other transaction data. For instance, the analytics server may execute a lower level authentication protocol for transactions that entail less than a predetermined payment amount. In some other configurations, the analytics server may execute a higher-level authentication protocol when the transaction amount is higher than a predetermined threshold.

As described above the methods and systems described herein are applicable to any electronic transaction. For instance, the methods and systems described herein can be applied to any credit card that is being physically used at a POS terminal or virtually used (e.g., on an online shopping website) to facilitate a transaction online.

The methods and systems described herein are particularly advantageous because they can be retroactively applied to existing payment systems. For instance, the methods and systems described herein can be provided as an additional security layer to assistant payment systems, such as credit/debit card issuers. The RFID transmitter can be retroactively installed on any payment card already in use. The RFID reader can be retroactively installed on any electronic device already owned and operated by the user. Therefore, the methods and systems described herein can be implemented as an additional layer security in existing payment systems and can be provided without interrupting the existing payment system. Furthermore, the methods and systems described herein do not interfere with existing cyber security or authentication protocols. For instance, a card issuer or payment facilitation server may still execute an existing authentication protocol and the methods and systems described herein may be used as supplemental authentication method.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A payment card, comprising:
   a card body;
   a radio frequency identification (RFID) chip coupled to or embedded within the card body and storing a unique number associated with a user of the payment card;
   an antenna coupled to the RFID chip, the antenna being configured to communicate the unique number to an RFID reader of an electronic device of the user as an authentication step for the payment card, wherein the electronic device of the user is different from a point-of-sale terminal, wherein the authentication step comprises:
   determining whether the RFID chip is located within a predetermined proximity to the electronic device based on a communication from the antenna to the RFID reader of the electronic device;
   when the payment card is determined to be located within the predetermined proximity to the electronic device, executing a first authentication protocol; and
   when the payment card is determined not to be located within the predetermined proximity to the electronic device, executing a second authentication protocol comprising transmitting an authentication prompt to the electronic device requesting the user to enter an authentication response; and
   a chip disposed on the card body and storing data on one or more integrated circuits, the chip being configured to communicate with the point-of-sale terminal to initiate a payment using the payment card when the chip is physically inserted within the point-of-sale terminal.

2. The payment card of claim 1, wherein the unique number comprises an account number of the user, a unique identifier of the payment card or both.

3. The payment card of claim 1, wherein the antenna is configured to propagate a radio frequency wave in both vertical and horizontal dimensions, wherein the radio frequency wave comprises the unique number.

4. The payment card of claim 1, wherein the antenna is configured to supply energy for the RFID chip from the RFID reader.

5. The payment card of claim 1, wherein the chip comprises an EMV (Europay, MasterCard, and Visa) chip.

6. The payment card of claim 5, wherein the RFID chip is configured to use an integrated circuit used by an EMV module of the payment card.

7. The payment card of claim 1, wherein the electronic device comprises a mobile device.

8. The payment card of claim 1, wherein the RFID chip is configured to collect DC power from a signal from the RFID reader.

9. The payment card of claim 1, wherein the RFID chip is configured to collect DC power from a local battery source on the payment card.

10. The payment card of claim 1, wherein the RFID chip comprises a logic circuit for processing information associated with the payment.

11. The payment card of claim 1, wherein the antenna is printed, or etched, or stamped with conductive ink, or vapor deposited, or any combination thereof, on the payment card.

12. The payment card of claim 3, wherein the antenna is configured for omnidirectional radiation or hemispherical coverage.

13. The payment card of claim 5, wherein the EMV chip comprises a circuit configured to communicate with the point-of-sale terminal to initiate the payment using the payment card without contacting the point-of-sale terminal by using near-field communication (NFC) technology.

\* \* \* \* \*